United States Patent
Danilov et al.

(10) Patent No.: US 11,354,054 B2
(45) Date of Patent: Jun. 7, 2022

(54) COMPACTION VIA AN EVENT REFERENCE IN AN ORDERED EVENT STREAM STORAGE SYSTEM

(71) Applicant: EMC IP Holding Company LLC, Hopkinton, MA (US)

(72) Inventors: Mikhail Danilov, Saint Petersburg (RU); Andrei Paduroiu, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 40 days.

(21) Appl. No.: 17/083,145

(22) Filed: Oct. 28, 2020

(65) Prior Publication Data

US 2022/0129177 A1   Apr. 28, 2022

(51) Int. Cl.
   *G06F 3/06*   (2006.01)
(52) U.S. Cl.
   CPC .......... *G06F 3/0643* (2013.01); *G06F 3/0604* (2013.01); *G06F 3/0679* (2013.01)
(58) Field of Classification Search
   CPC ..... G06F 3/0643; G06F 3/0604; G06F 3/0679
   See application file for complete search history.

(56) References Cited

U.S. PATENT DOCUMENTS

| | | | |
|---|---|---|---|
| 3,617,587 A | 11/1971 | Nayar et al. | |
| 5,826,977 A | 10/1998 | Fowler et al. | |
| 8,572,091 B1 | 10/2013 | Sivasubramanian et al. | |
| 8,655,825 B2 | 2/2014 | Roesch et al. | |
| 8,825,848 B1 | 9/2014 | Dotan et al. | |
| 9,514,018 B2 | 12/2016 | Sikh | |
| 9,639,589 B1 * | 5/2017 | Theimer | G06F 11/3006 |

(Continued)

FOREIGN PATENT DOCUMENTS

| | | |
|---|---|---|
| CA | 2672879 | 4/2008 |
| CN | 1708029 | 12/2005 |

(Continued)

OTHER PUBLICATIONS

Martin Kleppmann, Making Sense of Stream Processing, O'Reilly Media, 2014 (Year: 2014).*

(Continued)

*Primary Examiner* — Ryan Bertram
(74) *Attorney, Agent, or Firm* — Amin, Turocy & Watson, LLP

(57) ABSTRACT

Compaction of an ordered event stream (OES) is disclosed. An OES storage system can employing multiple tiers of storage devices, wherein the different tiers each can provide certain advantages and disadvantages that can be used to balance OES event storage costs, both monetarily and in terms of computing resource burden. Compaction can be facilitated by storing, in a stream map, a reference to an event stored via a second tier of storage in contrast to storing in the stream map actual events of a first tier of storage. A reference can be enabled by storing events in a chunk body and storing a location relationships in a header of the chunk. The stream map can then search headers for references, which can often be smaller than the events themselves, which references can then be communicated, stored, and updated in the stream map to facilitate OES compaction.

20 Claims, 10 Drawing Sheets

(56) References Cited

U.S. PATENT DOCUMENTS

| | | | |
|---|---|---|---|
| 9,753,932 | B1 | 9/2017 | Brow et al. |
| 9,898,482 | B1 | 2/2018 | Bono |
| 9,965,215 | B1 | 5/2018 | Vazhenin et al. |
| 10,565,208 | B2 | 2/2020 | Triou, Jr. et al. |
| 10,860,457 | B1 | 12/2020 | Evenson |
| 10,867,033 | B2 | 12/2020 | Keren et al. |
| 11,016,826 | B2 | 5/2021 | Lehmann |
| 11,194,638 | B1* | 12/2021 | Danilov .................. G06F 9/542 |
| 2004/0199524 | A1 | 10/2004 | Rys et al. |
| 2005/0055519 | A1 | 3/2005 | Stuart et al. |
| 2007/0220518 | A1* | 9/2007 | Verbowski ............ G06F 21/552 717/158 |
| 2008/0184262 | A1 | 7/2008 | Ginis et al. |
| 2008/0301135 | A1 | 12/2008 | Alves et al. |
| 2009/0182784 | A1 | 7/2009 | Rohit et al. |
| 2010/0083098 | A1 | 4/2010 | Leme et al. |
| 2010/0125794 | A1 | 5/2010 | Hampton et al. |
| 2011/0126099 | A1 | 5/2011 | Anderson et al. |
| 2011/0131588 | A1 | 6/2011 | Allam et al. |
| 2011/0249147 | A1 | 10/2011 | Ishii |
| 2012/0102503 | A1 | 4/2012 | Meijer et al. |
| 2012/0109985 | A1 | 5/2012 | Chandrasekaran |
| 2013/0226931 | A1 | 8/2013 | Hazel et al. |
| 2013/0275808 | A1 | 10/2013 | McNeeney et al. |
| 2014/0089264 | A1 | 3/2014 | Talagala et al. |
| 2014/0223115 | A1 | 8/2014 | Dinkjian et al. |
| 2015/0169449 | A1 | 6/2015 | Barrell et al. |
| 2015/0172120 | A1 | 6/2015 | Dwarampudi et al. |
| 2015/0341212 | A1* | 11/2015 | Hsiao ...................... G06F 16/26 715/735 |
| 2015/0363245 | A1 | 12/2015 | Mutschler |
| 2016/0063080 | A1 | 3/2016 | Nano et al. |
| 2016/0210061 | A1 | 7/2016 | Soncodi et al. |
| 2016/0321287 | A1 | 11/2016 | Luthra et al. |
| 2016/0337435 | A1 | 11/2016 | Nigam et al. |
| 2016/0357476 | A1 | 12/2016 | Chen et al. |
| 2017/0075832 | A1* | 3/2017 | Bhimani ............. G06F 16/2322 |
| 2017/0075947 | A1 | 3/2017 | Kurilov et al. |
| 2017/0177263 | A1 | 6/2017 | Das et al. |
| 2017/0212891 | A1 | 7/2017 | Pundir et al. |
| 2018/0101842 | A1 | 4/2018 | Ventura et al. |
| 2018/0121307 | A1 | 5/2018 | Braun et al. |
| 2018/0176244 | A1 | 6/2018 | Gervais et al. |
| 2018/0184138 | A1 | 6/2018 | Shaw et al. |
| 2018/0329644 | A1 | 11/2018 | Das et al. |
| 2018/0332325 | A1 | 11/2018 | Kaitchuck |
| 2018/0332365 | A1 | 11/2018 | Kaitchuck et al. |
| 2018/0332366 | A1* | 11/2018 | Paduroiu ............ H04N 21/4331 |
| 2018/0332367 | A1 | 11/2018 | Kaitchuck et al. |
| 2018/0336256 | A1* | 11/2018 | Li ........................ G06F 16/2272 |
| 2018/0345140 | A1 | 12/2018 | Posin |
| 2019/0026301 | A1 | 1/2019 | Wang et al. |
| 2019/0138494 | A1 | 5/2019 | Inoue |
| 2019/0340180 | A1 | 11/2019 | Barsness et al. |
| 2019/0349422 | A1 | 11/2019 | Dhruvakumar et al. |
| 2020/0034468 | A1 | 1/2020 | Lei et al. |
| 2020/0174695 | A1 | 6/2020 | Bazarsky et al. |
| 2020/0250172 | A1 | 8/2020 | Busjaeger et al. |
| 2020/0320005 | A1* | 10/2020 | Shulman ............. G06F 16/2477 |
| 2020/0344299 | A1 | 10/2020 | Sohail et al. |
| 2020/0394196 | A1 | 12/2020 | Shivanna et al. |
| 2020/0404011 | A1 | 12/2020 | Gervais et al. |
| 2021/0110328 | A1* | 4/2021 | Hsiao ................ G06F 16/24568 |
| 2021/0124746 | A1 | 4/2021 | Klaedtke |
| 2021/0256029 | A1 | 8/2021 | Danilov et al. |
| 2021/0342296 | A1 | 11/2021 | Danilov et al. |
| 2021/0342354 | A1 | 11/2021 | Danilov et al. |
| 2021/0365211 | A1* | 11/2021 | Danilov ..................... G06F 9/50 |
| 2022/0035533 | A1 | 2/2022 | Danilov et al. |

FOREIGN PATENT DOCUMENTS

| | | |
|---|---|---|
| CN | 104901958 | 9/2015 |
| CN | 105591926 | 5/2016 |
| GB | 2377038 | 12/2002 |
| WO | 2002101585 | 12/2002 |
| WO | 2009014993 | 1/2009 |
| WO | 2015191120 | 12/2015 |
| WO | 2018148149 | 8/2018 |

OTHER PUBLICATIONS

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Notice of Allowance dated Aug. 4, 2021 for U.S. Appl. No. 17/200,652, 51 pages.

Office Action dated Oct. 1, 2021 for U.S. Appl. No. 16/915,762, 57 pages.

Office Action dated Oct. 1, 2021 for U.S. Appl. No. 17/127,724, 41 pages.

Office Action dated Nov. 10, 2021 for U.S. Appl. No. 16/944,089, 75 pages.

Kleppmann, Martin. "Making Sense of Stream Processing—The Philosophy Behind Apache Kafka and Scalable Stream Data Platforms"; Mar. 4, 2016; retrieved from [https://hashingit.com/elements/

(56) References Cited

OTHER PUBLICATIONS research-resources/2016-03-04-making-sense-of-stream-processing.pdf] on Nov. 5, 2021, (Year 2016), 183 pages.
Notice of Allowance dated Dec. 15, 2021 for U.S. Appl. No. 17/064,747, 54 pages.
Office Action dated Jan. 21, 2022 for U.S. Appl. No. 16/864,892, 26 pages.
Notice of Allowance dated Feb. 4, 2022 for U.S. Appl. No. 16/915,762, 57 pages.
Office Action dated Apr. 20, 2022 for U.S. Appl. No. 16/944,094, 48 pages.
M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).
Notice of Allowance dated Feb. 24, 2022 for U.S. Appl. No. 17/038,079, 55pgs.
Azhar et al., "Efficient selection of access control systems through multi criteria analytical hierarchy process", IEEE, doi: 10.1109/ICET.2012.6375419, 2012, pp. 1-8. (Year: 2012).
Rox et al., "Construction and Deconstruction of Hierarchical Event Streams with Multiple Hierarchical Layers", IEEE, doi: 10.1109/ECRTS.2008.13, 2008, pp. 201-210. (Year: 2008).
Office Action dated Apr. 12, 2022 for U.S. Appl. No. 17/038,102, 48 pages.
Office Action dated Mar. 21, 2022 for U.S. Appl. No. 16/864,905, 125 pgs.
Edi Muskardin et al.,"Implementation of Hashing Algorithms in Stream Mining", International Conference on Smart Systems and Technologies (SST), Oct. 2018 , pp. 233-238.
Notice of Allowance dated Apr. 11, 2022 for U.S. Appl. No. 16/944,089, 87 pages.
J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154 (Year: 2014).
T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).
Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).

* cited by examiner

COMPACTION VIA AN EVENT REFERENCE IN AN ORDERED EVENT STREAM STORAGE SYSTEM

TECHNICAL FIELD

The disclosed subject matter relates to data storage and, more particularly, to compaction of an ordered event stream of an ordered event stream storage system.

BACKGROUND

Conventional data storage techniques can employ an event stream, e.g., storing data corresponding to a stream of events in a logical order. In a conventional system, an event stream can provide for storing a generally unbounded stream of events whereby a portion of the stored events can then be read out in the order they were stored. One use of data storage is in bulk data storage. Compaction of an event stream can be desirable, for example, to enable reduction of a footprint of a stream while preserving the pertinent information stored in the stream.

DETAILED DESCRIPTION

Figure 1:
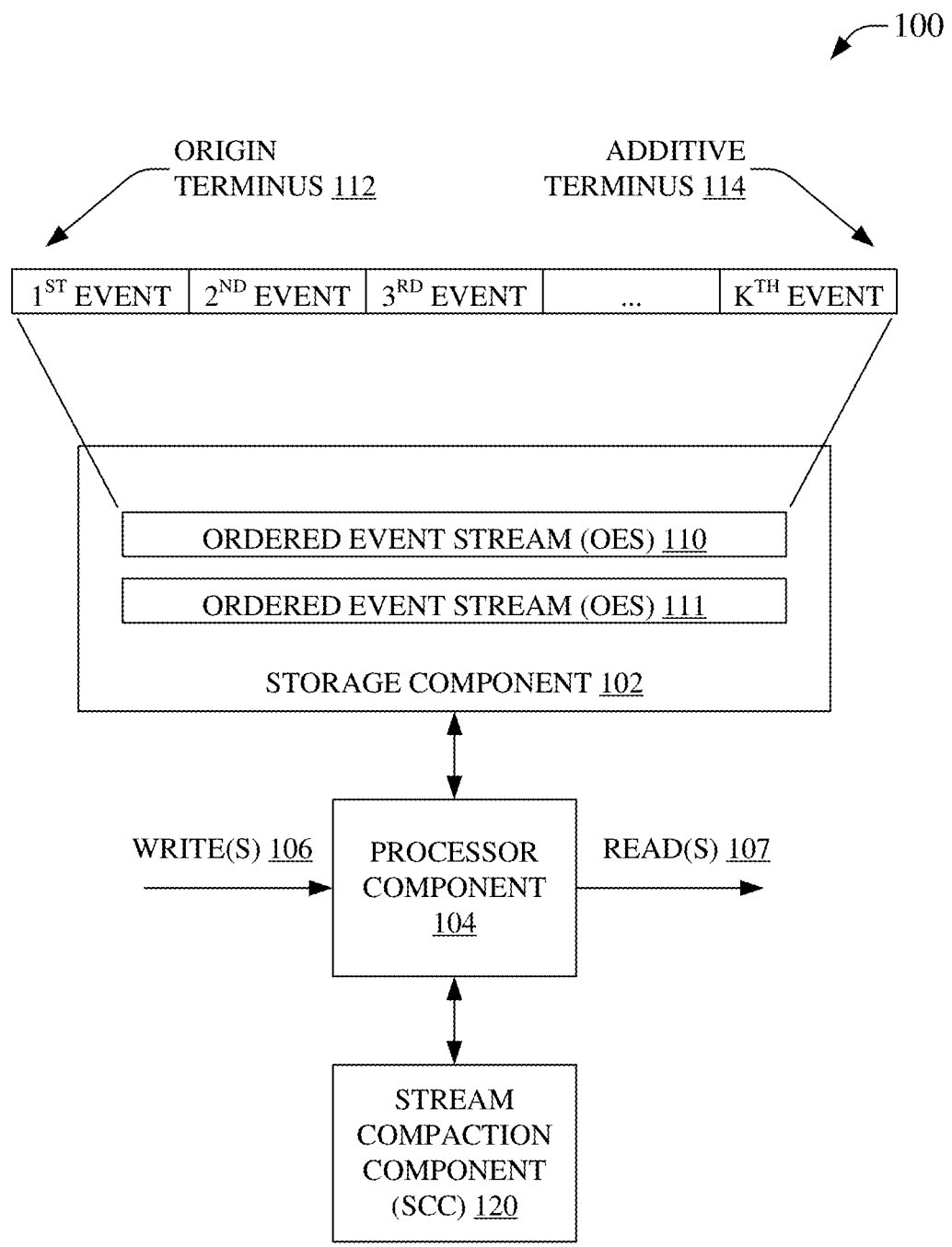
FIG. 1 is an illustration of an example system that can facilitate compaction of an ordered event stream, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional event stream storage techniques, as mentioned, can provide for storing a generally unbounded stream of events whereby a portion of the stored events can then be read out in the order they were stored. This can lead to large amounts of stored data and compaction of an event stream can be desirable, for example, to enable reduction of a footprint of a stream while preserving the pertinent information stored in the stream.

In an aspect, events, as disclosed herein, can be stored in a stream according to a routing key, hereinafter 'key,' which can be derived from data of an event. Presently disclosed data storage systems can enable access to events with a same routing key in an order in which those events are written into the ordered event stream (OES). In an aspect, compaction of an OES, as disclosed herein, can attempt to ensure that a stream storage system will always retain at least a last known value for each routing key present in an OED. This aspect can facilitate restoring a state of an application, e.g., a reader application, writer application, etc., after an application crashes, the a data storage system becomes less accessible, or other interruptions to the normal function of an OES storage system, as an example, reloading caches after an application restarts post-operational maintenance, etc. Stream compaction therefore can be a specific event retention mechanism to retain at least a last update for each routing key of an OES, which can provide a complete snapshot of a final value for every key, e.g., not just keys that changed recently. This aspect can enable a downstream consumer, for example, a reader application, etc., to restore to a state of the stream without the downstream consumer having to retain a complete stream of all changes.

An OES can be split into a set of shards or partitions generally referred to as stream segments, segments, etc. The segments can act as logical containers for events within the OES. Writing a new event to an OES can result in storing the event to one of the segments based on a corresponding routing key, e.g., that can be determined from the event data in some embodiments. In an aspect, a key can often be derived from data of the event, e.g., a "machine-id," "location," "device type," "customer number," "vehicle identifier," etc. As such, events with the same routing key can be consumed, e.g., read, in the order they were written. Routing keys can be hashed to form a "key space." The key space can be divided into a number of partitions. Consistent hashing can enable reliably assigning events to segments that comprise events with the same key. An OES stream can have a topology that evolves and corresponds to different epochs, e.g., via scaling of an OES. As an example, an OES can initially have a first segment, but where writing of events increases above a threshold level, the OES can be scaled to comprise two segments, e.g., a second segment and a third segment. In an aspect, each of the second and third segments can employ a separate processor instance to write events, e.g., scaling the OES can increase the count of processors writing events to the OES. Accordingly, a hashed key space can be divided to encompass the second and third segments of the scaled OES. As an example, the example OES initially can have the first segment covering a key space of 0 to 1, and after the scaling, the second segment can cover events from 0 to 0.25 of the key space and the third segment can cover events from 0.25 to 1 of the key space. Additionally, the scaling of the OES can constitute an epoch change, e.g., evolution of the topology of the OES, such that before the scaling the OES had the first segment in Epoch 1 and, after the scaling, the OES can have a second and third segment in Epoch 2. In an aspect, the first segment can be closed at the epoch change and the second and third segments can be opened at the epoch change. In an aspect, the topology change of the OES can result in a change in storage scheme, e.g., in the above example, reading an event with a key space value of 0.75 in the first epoch can read from the first segment and can be distinct from reading another event with a key space value of 0.75 in the second epoch that would read from the third segment. The use of different storage schemes for events of an ordered event stream (OES), e.g., an OES having different OES segment schemes as an OES advances, can require reading out OES events according to those different storage schemes.

An OES storage scheme can correspond to a distribution of a hashed key space to segments of an OES. As an example, a first OES storage scheme can have a hashed key space extends from 0 to 1, wherein a first segment can store events having a hashed key value 'y' between 0 and 0.28, e.g., $0 \leq y < 0.28$, and a second segment of the OES can store events having 'y' between 0.28 and 1, e.g., $0.28 \leq y < 1$. The example first OES storage scheme can be altered to a next storage scheme, e.g., advanced to a second epoch, wherein the first and second segment can be closed and a third and fourth segment can be opened wherein third segment can store events having a hashed key value 'y' between 0 and 0.7, e.g., $0 \leq y < 0.7$, and the fourth segment of the OES can store events having 'y' between 0.7 and 1, e.g., $0.7 \leq y < 1$. Moreover, the second epoch can end when a third epoch is begun that represents a third OES storage scheme, for example, closing the third and fourth segments and opening fifth through seventh segments, wherein the fifth segment can store events having a hashed key value 'y' between 0 and 0.1, e.g., $0 \leq y < 0.1$, the sixth segment can store can store events having 'y' between 0.1 and 0.5, e.g., e.g., $0.1 \leq y < 0.5$, and the seventh segment can store can store events having 'y' between 0.5 and 1, e.g., $0.5 \leq y < 1$.

Generally, changes to an OES storage scheme, e.g., an epoch change, etc., can be in response to an indication that computing resources are becoming sufficiently burdened. In a conventional system, an event stream can typically be evenly bifurcated, e.g., each of the two resulting event stream portions can be about one half of the initial event stream in an attempt to divide the amount of computing resources used in the initial stream about evenly between the initial computing resources and newly added additional computing resources. As an example, if an initial event stream causes a load of two units of work for a first processor, the two units of work load are correspond to an even distribution of work across the associated key space of the initial event stream, and the two units of work exceed a threshold work level of the first processor, the stream can be split and a second processor can be added, such that the first processor now supports a second stream, in lieu of the initial stream, at about one unit of work and a third stream can be supported at about one unit of work by a the second processor, again, assuming the work load from the initial stream was distributed roughly evenly across the key space of the initial event stream. In an aspect, the presently disclosed subject matter can employ improved scaling of an event stream or portion thereof, e.g., asymmetric scaling, scaling up, scaling down, scaling into more than two seg-ments, etc. Examples of an ordered event streaming storage platform can be STREAMING DATA PLATFORM (SDP) by DELL EMC, PRAVEGA by DELL EMC, or another similar OES data storage system. An event can be added to a head of a stream of events, e.g., a first event can be considered at a tail of the event stream and a most recent event can be regarded as at the head of the stream with other events ordered between the tail and the head of the stream. It is noted that some OES system embodiment(s), e.g., PRAVEGA by DELL EMC, etc., can employ an inverted head/tail terminology, e.g., in PRAVEGA a first event can be added at a head of an OES, while subsequent new events can then be added to a tail of the OES, however, this is indistinguishable in all other aspects from the head/tail convention employed in the instant disclosure.

In an aspect, a segment of an event stream can generally be associated with a single processing instance to assure ordering of the events stored in the segment. A processing instance can be a single real physical processor, a virtualized processor executing on one or more real physical processors, a group of real physical processors, a group pf virtual processors executing on one or more real physical processors, etc. As an example, a processing instance can be a blade server of a rack system. As another example, a processing instance can be a virtual processor deployed in an elastic computing system, e.g., a 'cloud server,' etc.

Typically, the processing instance can be associated with a level of processor performance which, in some embodiments, can be measured via one or more key performance indicators (KPIs) for the processing instance. As an example, a first blade server of a rack can have a first level of performance and a second blade server of a rack can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support costs, real estate for deployment costs, etc. As such, selecting an appropriate processing instance can be associated with optimizing cost. As an example, if an event stream always consumes less than one unit of work, then pairing the stream with a processing instance that can perform one unit of work can be a better use of computing resources, e.g., lower overall aggregate costs, etc., than pairing the even stream with a processing instance that can perform 200 units of work which can result in wasting up to 199 units of work through underutilization. Moreover, in this example, the 200 unit processing instance, for example, can be a newer high end processing instance that can have a high monetary cost, and generate more heat than the one unit processing instance that, for example, can be a low cost commodity processing instance that is plentiful, has a low monetary cost, and is already widely deployed. As such, paring the one unit of work event stream with a racecar of a performance instance can be understood as possibly not being an optimal pairing in comparison to a more pedestrian performance instance.

In an aspect, transitions between OES epochs, e.g., changing OES storage schemes can be related to changing write and read demands associated with a stream of data. As an example, writing ride share service events to an OES can be according to OES segments that can divide the hashed key space into regions, e.g., a west region, a central region, and an east region. In this example, as peak demand for ride share services can be associated with the time zones, for example being busier in the east zone at local 5 pm than in the west zone that is at local 2 pm. A such, there can be more demand, in this example, to write data to the OES segment corresponding to the east region and the storage scheme can meet this demand by scaling the OES segment to allow more east region data to be written, e.g., splitting the example OES segment to more segments to allow engaging more processors, which, in some embodiments, can increase the hashed key space related to the now plural OES segments for east region event writing. Moreover, as time continues, demand can increase in the west region and wane in the east region, for example 5 pm in the west can be 8 pm in the east. As such, the east region segments can be scaled down and the west region segments can be scaled up, e.g., effectively shifting processing power to storage of west region events rather than east region events. The change in scaling of the segments of the OES can be associated with a change in storage scheme that can be referred to as a change in OES storage epochs, for example see system 200, etc. The details on epoch changes are generally outside the scope if the instant disclosure but changes in OES storage schemes can be relevant to the instant disclosure in that these epoch changes can complicate retention of events, e.g., a checkpoint in a first epoch can be distinct from a checkpoint in an second epoch, a reader initially reading events from a segment in a first epoch can transition to reading events in more, or fewer, segments in a second epoch, etc., and this can complicate reporting of checkpoints. Aggregation of checkpoints can therefore be understood to simplify determining what events should be retained across a scalable OES, as is disclosed in more detail herein below.

In an aspect, a segment can be scaled where a threshold performance occurs. As an example, an event stream segment can typically consume less than one unit of work, e.g., one unit of computing resources, and the stream segment can be associated with a processing instance that can perform up to one unit of work. However, in this example, where the segment increases demand to 1.5 units of work, the segment can be scaled, e.g., split into two daughter segments, such that each daughter segment can be associated with events for half of the key space of the parent segment before scaling. In this example, where the daughter segments are each associated with a processing instance that can perform one unit of work, and where the key space of the initial segment has a generally even distribution of work, then each daughter segment, for example, can be associate with about 0.75 units of work, e.g., the parent segment now consumes at 1.5 units, e.g., exceeding the capacity of the existing processing instance, and the parent segment can be split into two daughter segments at about 0.75 units each where each daughter segment can now consume less than the one unit of work available through their corresponding processing instances.

In an aspect, and OES storage system can be instructed to retain a designated number, amount, etc., of most recent events/data. As such, older or stale events/data can be deleted. However, where an older event can still be relevant, deletion can be undesirable. In this or other situations, it can be desirable to move the event data to another type of storage. This can lead to a multi-tier OES storage system, for example having tier-1 storage for most recent events, tier-2 storage for older events that remain desirable to retain. Moreover, older events that are stale can then be deleted in some embodiments. In other embodiments, older events can be moved to permanent off-line archive storage, or other archival technologies. In an embodiment, tier-1 storage can be storage that facilitates fast access to events/data in comparison to tier-2 storage. As an example, tier-1 storage can be a storage of a single data center providing fast access to stored events via a local network or bus, while a corresponding tier-2 storage can store data in multiple geographically distinct locations connected via a communications framework, such as a wide area network, that can result in event/data access being slower than via the tier-1 storage, e.g., tier-2 can have more latency, reduced bandwidth, greater error correction needs, or other impediments, that can lead to slower access to events stored via the example tier-2 system. In one example embodiment, a first tier embodied in PRAVEGA can be coupled with a second tier embodied in ECS by DELL EMC. In this example embodiment, tier-1 events can be readily accessed in PRAVEGA while tier-2 events can be aggregated into chunks written into ECS for storage. As such, in this example, access to events via ECS chunks can typically be slower than access to events via PRAVEGA. In an aspect, a chunk, e.g., an ECS chunk, or other block of data, can be an ordered series of events. In this case, PRAVEGA can work as a Tier-1 of a multi-tiered system and the ECS storage system can work as a Tier-2. Autotiering can enable transitioning tier-1 events to other tiers, e.g., moving events from tier-1 'hot' access to other tiers that can have 'cooler' access.

Where an OES employs multi-tier topology, it can be efficient to store a great deal of OES data via tier-2 to allow tier-1 data to be stored in a nimble and efficient manner, e.g., where tier-2 can be less costly, widely available, highly resilient storage, and where tier-1 can be more costly, less widely available, etc., offloading all but hot data can be desirable in an implementation. However, compaction of an OES, for example in a multi-tier topology, can be computing resource intensive. As an example, where most events can be stored in an example ECS-type tier-2 data store, mapping an OES to enable compaction can include accessing data stored in chunks of the ECS-type data store, which can include communication over a wider network than a tier-1 portion of the OES, accessing chunks via typically slower computing equipment, e.g., cooler data storage can use slower processors, memory, drives, etc., than a hot data storage. In this example, there is more data to access via slower equipment, across slower/longer network paths, among other retardants to fast access associated with tier-1 type storage. Technology to improve event mapping and/or event access in a multi-tier OES storage system can be desirable. Accordingly, chunks for storing events can be adapted to comprise an indication of event keys for events stored via the chunk, for example a chunk can comprise a header storing a key and an index value corresponding to an event stored via a body of the chunk. This example can enable identifying that the chunk stores an event corresponding to the key and can further enable access to the portion of the chunk body that stores the event, e.g., based on the index value. This can be beneficial to a multi-tier OES storage system in that, for example, it can allow reading of chunk headers to locate events that can later be accessed according to the index value, which can be less computer resource intensive than reading entire chunks to directly ascertain presence of an event for a key value.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate compaction of an ordered event stream, in accordance with aspects of the subject disclosure. System 100 can comprise a storage component 102 that can store an ordered event stream (OES) 110, 111, etc. OES 110, 111, etc., which can store one or more events. An event can be associated with a key, e.g., a routing key. A key can typically be determined from aspects of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110, 111, etc., in an ordered manner. Similarly, events with a same key can be read from OES 110, 111, etc., generally in an ordered manner, e.g., generally in the order they were previously written into OES 110, 111, etc. Components providing events to be written can be termed 'writers' and components requesting events can be termed 'readers'. As such, a writer can provide an event that can be written to OES 110, 111, etc., in an ordered manner based on a key associated with the event. Similarly, a reader can receive an event from OES 110, 111, etc., based on a key.

Processor component 104 of a system 100 can receive write(s) 106 that can be written to OES 110, 111, etc., to be stored via storage component 102. Processor component 104 of a system 100 can provide access to events based on a key, e.g., as read(s) 107 that can be communicated to a reader. Generally, one processing instance, e.g., processor component 104, etc., is designated for writing events to a portion, e.g., segment, of OES 110, 111, etc. OES 110, 111, etc., can comprise one segment and/or parallel segments, e.g., stream segments, see FIG. 2, etc., that can store events according to a key. In an aspect, more than one processing instance writing to a segment of an OES is typically disfavored because it can increase the difficulty of writing incoming events in an ordered manner. However, a given processing instance can read/write to more than one OES segment, e.g., a given processing instance can write to one or more OESs, to one or more segments of one OES, to one or more segments of one or more OESs, etc. Generally, for a given number of segments there can typically be up to the same number of processing instances. Although adding more processing instances is allowable, these additional processing instances are generally idle to avoid possible scrambling of an order of events being written to a segment. It is further noted that system 100 can comprise idle processing instances, for example, as reserve processing instances for failover where an active processing instance becomes less responsive, etc. In an aspect, keys of one or more segments of an OES can represent a key space for OES 110, 111, etc., see FIG. 2, etc. Segments can therefore act as logical containers associated with a particular range of keys for an event stream and can be used to store events within an OES. When a new event is written to a stream, it can be stored to one of the segments based on the event key. In an aspect, the key space can be divided into a number of ranges that can correspond to the number of segments comprising an OES. As an example, a key space for an OES can be from 0 to 100, the OES can comprise two parallel segments wherein the first segment sequentially stores events with, for example, keys from 0 to 30 and the second segment sequentially stores events with keys from >30 to 100. In this example, a first event with a key of 54 can be appended to the second segment, a second event with a key of 29 can be appended to the first segment, a third event with a key of 14 can be further appended to the first segment after the second event, etc.

OES 110, 111, etc., as illustrated in system 100, can be a simplistic example of an OES that can comprise just one segment for storing incoming event write(s) 106 and sourcing event read(s) 107, and therefore the key space of OES 110, 111, etc., can be embodied in the example single segment of events, e.g., the key space of OES 110 is not illustrated as being distributed across more than one parallel event storage segment. Example OES 110 can have an origin terminus 112. A first event can be written at origin terminus 112. The subsequent events can then be appended at an additive terminus 114 that is typically always at the head of the stream of written ordered events, e.g., a most recent event is written to the head of example OES 110, which can provide ordering of the events being written. This can result in example OES 110 allowing for continuous and unbounded data storage that can be a durable, elastic, append-only, unbounded sequence of events. As an example, a $(K+1)^{th}$ event can be appended to the $K^{th}$ event of example OES 110 at additive terminus 114. In an aspect, storage component 102 can store any number of OESs, e.g., OES 110, 111, etc. Moreover, any one OES can comprise any number of parallel segments, e.g., stings of events for a defined key space range. Each segment can comprise an ordered sequence of stored events.

In an aspect, an OES, e.g., OES 110, 111, etc., can be scaled, for example, 'scaling up,' e.g., increasing a count of parallel segments of OES 110, 'scaling down,' e.g., decreasing a count of parallel segments of OES 110, etc. Moreover, OESs, or portions thereof, can be merged, e.g., can be allowed to be read out in a manner that merges the ordering of the written OES events. As an example, OES 110 and OES 111 can be merged such that reading out the merge can comprise reading out the events of each of OES 110 and 111 in an ordered sequence related to the order in which the events were written to each of OES 110 and 111.

In system 100, stream compaction component (SCC) 120 can facilitate compaction of events of an OES(s). In an aspect, an OES can comprise events ordered according to a progress metric, for example where progress is temporal, a most recent event, an older event and an oldest event. Where the example OES is designated as retaining fewer events than this, some events can be removed from the OES. This can occur, for example, to conserve storage space, based on a cost threshold, or due to other constraints. Accordingly, for example, in the above example, compaction can release the oldest event to make room for storing an incoming most recent event. An OES can therefore correspond to a map of OES events. A map can reflect changes to an OES, and can enable compaction of the OES, e.g., the above example of dropping the oldest event can correspond to the map adding the incoming most recent event to the map and deleting the oldest event from the map. It is noted that other changes to the OES and a corresponding map can occur, for example, stale events can be removed from any position in the map, the map can transition tier-1 events to other tier(s), or other changes. As such, where storage component 102 can comprise event storage in different storage tiers, for example a first tier can comprise local storage devices and a second tier can comprise remotely located ECS storage devices, etc., SCC 120 can enable storage of chunks among the tiers, whereby a chunk can store an indication of what events are stored via the chunk, e.g., keys in a chunk header, where said events are stored in the chunk, e.g., index values in the chunk header, and the events themselves, e.g., actual events in a chunk body. SCC 120 can then enable access to the chunks to facilitate mapping of an OES, for example across multiple tiers, based on the keys and enabling, via the index values, to the events on an as needed basis.

Figure 2:
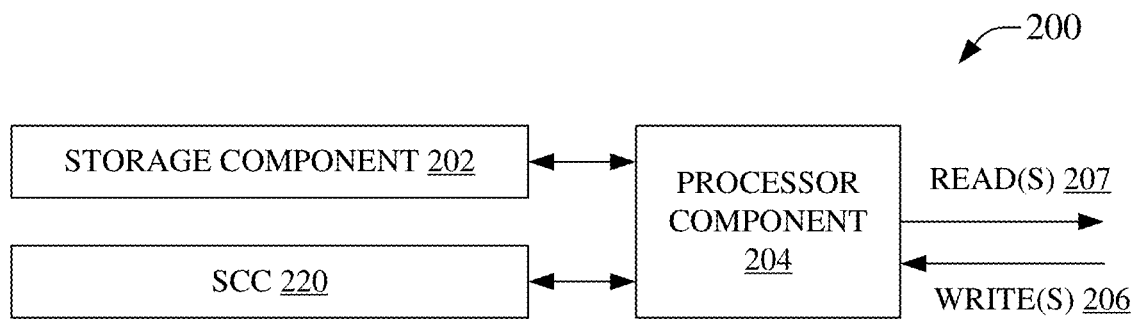
FIG. 2 is an illustration of an example system enabling compaction of an ordered event stream via employing a chunk comprising a header facilitating storage of event routing key relationship information, in accordance with aspects of the subject disclosure.
Figure 2:
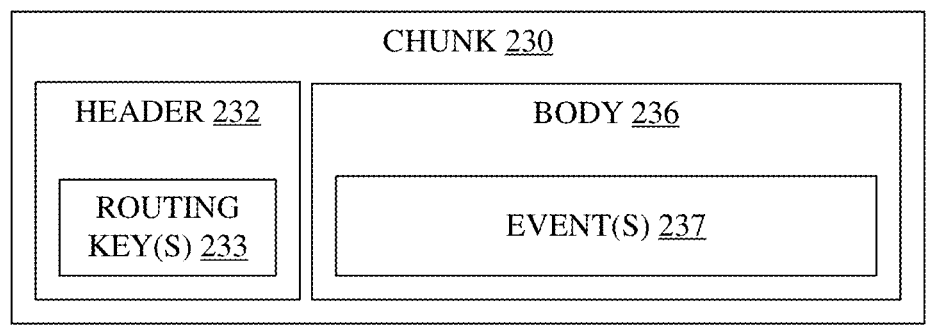
Figure 2:
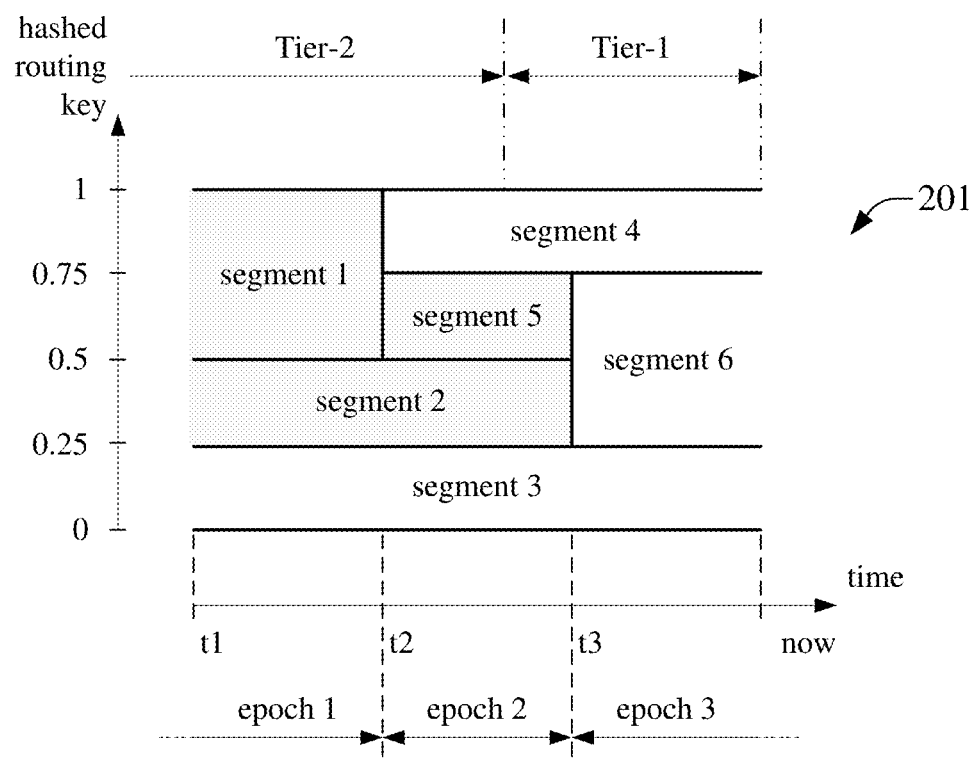

FIG. 2 is an illustration of an example system 200 enabling compaction of an ordered event stream via employing a chunk comprising a header facilitating storage of event routing key relationship information, in accordance with aspects of the subject disclosure. Ordered event stream data storage system 200 can comprise processor component 204 that can receive write(s) 206 and enable read(s) 207 for events stored via storage component 202. SCC 220 can enable mapping of events stored via storage component 202. In an embodiment, storage component 202 can comprise storage different types of event storage, e.g., a tier-1 store, a tier-2 store, etc. In an aspect, the different tiers of storage can enable efficient storage of events, for example, storing cooler events in low cost storage to enable consuming less high cost storage typically associated with storing hotter events. Events can be stored according to a chunk, e.g., chunk 230, or other chunk formats. In an embodiment, tier-2 storage can be via an ECS-type environment that can store chunks such as chunk 230.

Chunk 230 can comprise header 232 and body 236. Header 232 can comprise routing key(s) 233. Body 236 can comprise event(s) 237. In an aspect, a routing key of routing key(s) 233 can correspond to a routing key of an event of event(s) 237. A header can be populated with event indexes when the chunk is created, e.g., the body can be read to determine events, keys, indexes, or other data, that can then be used to populate the chunk header. In an example, routing key(s) 233 can comprise keys "KA", "KB", and "KD" that can correspond to events A1, B1, and D1 of event(s) 237. In this example, header 232 can therefore comprise information, e.g., KA, KB, and KD, that can indicate that the body comprises events A1, B1, and D1. Additionally, header 232 can comprise an index value corresponding to a location of an event in the body. In an aspect, the index value can indicate where in the body the corresponding event is located. Index values can be based on an incremental index step, for example, where an event is always 12 units in size, an index value of two can indicate that the event data is stored between 24 units and 36 units of memory from the start of body 237, e.g., index zero is from zero to 12 units, index one is from 12 to 24 units, index two is from 24 to 36 units, index three is from 36 to 48 units, and so forth. In some embodiments, the incremental index step can default to a count of bytes from the start of body 236, e.g., an index value of 16384 can indicate that the event data starts 16,384 bytes from the start of body 236. An index value can be correlated to a routing key stored in header 232. In some embodiments multiple index values can be associated with a routing key stored in header 232.

Where chunk 230 can store multiple events, some of those events can have a same routing key. As an example, a widget processing plant can generate an event for each produced widget that passes a final quality control (QC) inspection, wherein each such event can be stored via an OES according to a same routing key. In this example, it is readily appreciated that many events can have the same routing key, e.g., all the widgets shipped out can have events with a 'passes final quality control' routing key, although the events can store different data, for example date and time the final QC was passed, the name of the QC inspector passing the widget, or other event data. As such, routing key(s) 233, in this example, can comprise one key, e.g., 'passes final quality control' routing key, but can reference, e.g., via index values, many events of event(s) 237. In this example, routing key(s) 233 can be affiliated with one index values, some index values, or all index values. As an example, the 'passes final quality control' routing key of routing key(s) 233 can be affiliated with only a most recent QC pass event of event(s) 237. As another example, the 'passes final quality control' routing key of routing key(s) 233 can be affiliated with the last eight QC pass events of event(s) 237. As a further example, 'passes final quality control' routing key of routing key(s) 233 can be affiliated with all QC pass events of event(s) 237. It is noted that other chunks can similarly store a 'passes final quality control' routing key that can be affiliated with one, some, or all QC pass events stored via that other chunk.

In an aspect, events from different segments can be stored via one or more chunks. Typically, OES events can be stored at progress points, for example, time, count, or some other progress metric, e.g., at a number of revolutions, at a time of day, per occurrence of a transaction, a count of widgets passing QC, etc. Generally, for the sake of simplicity, progress is typically discussed in terms of time throughout the instant disclosure, however other progress types are expressly within the scope of the instant disclosure and can be readily employed in almost any aspect disclosed herein. At a first progress point, for example t1, OES 200 can comprise one or more parallel segments, e.g., segment 1, segment 2, segment 3, etc. At some point a segment can be scaled. As an example, at t2, segment 1 can be scaled up. This can result in causing segment 4 and segment 5 and correspondingly sealing segment 1. The topology of the OES comprising segments 1, 2, and 3 before scaling can be designated as epoch 1. Similarly, the topology of the OES comprising segments 2, 3, 4, and 5 after scaling can be designated as epoch 2.

In an aspect, segments 2 and 3 can be contiguous across epochs 1 and 2, while segment 1 can end at the transition from epoch 1 to 2. In an aspect, in epoch 1, events associated with a key between 0.5 and 1, e.g., 0.5≤key<1, can be written (and read from) segment 1, while in epoch 2, events associated with a key between 0.75 and 1, e.g., 0.75≤key<1.0, can be written (and read from) segment 4 and events associated with a key between 0.5 and 0.75, e.g., 0.5≤key<0.75, can be written (and read from) segment 5. As such, access to events for a given key can be associated with reads in different epochs. As an example, reading an event with a key of 0.8 can read from both segment 1 and segment 4. Where a read is performed from head to tail, the read of example events with a key of 0.8 can begin reading in segment 4 and then continue reading into segment 1 across the epoch boundary between epoch 2 and 1, albeit with different corresponding storage schemes used to facilitate the reading operation(s). Similarly, where the read can be from tail to head, events associated with the example key of 0.8 can begin in segment 1 and continue into segment 4 across the epoch boundary. However, it is noted that generally no additional events are written into segment 1 after a new epoch is begun. In epoch 2, the topology of OES 200 can comprise segments 2, 3, 4, and 5. At some point further scaling can be undertaken, e.g., at t3. OES 200, for example, can scale down by ending segments 2 and 5 and starting segment 6 beginning at t3. This example scaling down can reduce a count of segments comprising OES 200. The scaling at t3 can result in ending epoch 2 and beginning epoch 3. As such, in epoch 3, the topology of the OES comprising segments 3, 4, and 6, post-scaling, can distribute the key space of OES 200, for example, as 0≤segment 3<0.25, 0.25≤segment 6<0.75, and 0.75≤segment 4<1.0.

In an aspect, hierarchical event storage can be related to efficiency of event storage. In an example, it can be determined to be inefficient to store data in a first tier where that event has transitioned a designated event access frequency value. As such, in this example, where an event transitions the event access frequency value, it can be aggregated into a chunk of tier-2 type storage. As is indicated in illustration 201, example tier-1 can store events within a designated period of time and tier-2 can store event older than the tier-1 events. As such, tier-1 can store, for example, events of segments 6, as well as some events of segments 2, 3, 4, and 5, while tier-2 can store events of segment 1, as well as other events of segments 2, 3, 4, and 5. Accordingly, event storage via chunk 230 can include storage of events in one or more segment, in one or more epoch, and in one or more storage-type tiers.

Figure 3:
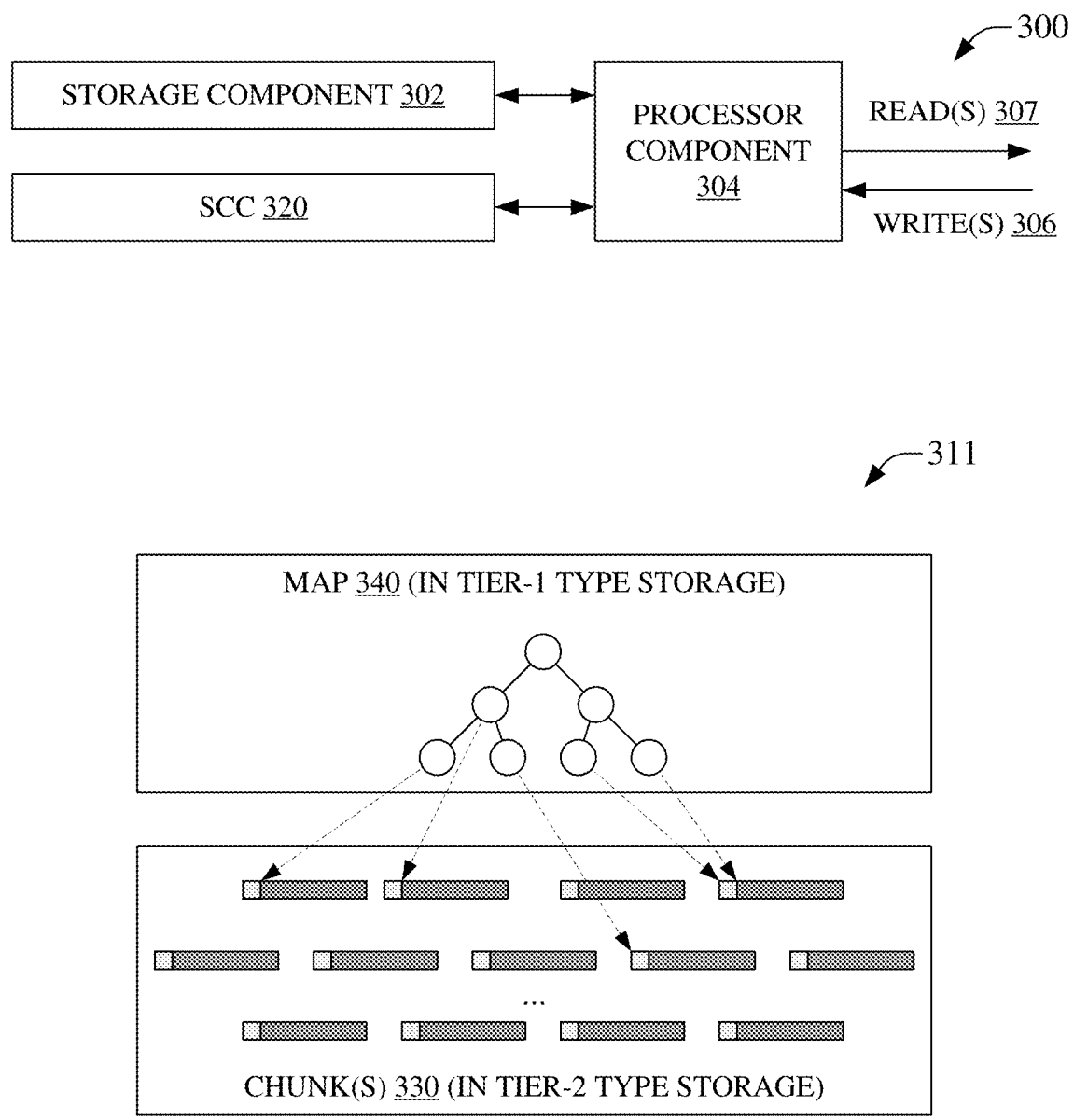
FIG. 3 illustrates an example system that can facilitate compaction of an ordered event stream in an ordered event stream comprising one or more tiers of event data storage, in accordance with aspects of the subject disclosure.

FIG. 3 is an illustration of a system 300, which can facilitate compaction of an ordered event stream in an ordered event stream comprising one or more tiers of event data storage, in accordance with aspects of the subject disclosure. Ordered event stream data storage system 300 can comprise processor component 304 that can receive write(s) 306 and enable read(s) 307 for events stored via storage component 302. SCC 320 can enable mapping of events stored via storage component 302. In an embodiment, storage component 302 can comprise storage different types of event storage, e.g., a tier-1 store, a tier-2 store, etc. Events can be stored in tier-1 type storage and via chunk(s) 330, e.g., in tier-2 type storage. Map 340 can similarly be stored via tier-1 type storage.

Map 340 can be generated via an OES cleaner process (OCP) that can be performed via SCC 320. An OCP can read events of an OES, e.g., via read(s) 307 via processor component 304, for example, as instructed by with SCC 320. OCP, via SCC 320 can generate a map that can reference a stored event according to a key. In an example, chunk 230 can store an event of event(s) 237 in body 236 that can be referenced by a key of routing key(s) 233 of header 232, wherein a position of the event in body 236 can be indicated by an index value into body 236. Accordingly, in this example, map 340 can store a key-value map, e.g., a key and a location of an event corresponding to the key. In an embodiment, this can be a key and a location of a highest progress event corresponding to the key where there can be multiple events with a same key, e.g., the map can indicate the latest progress events for keys of an OES.

In an embodiment, newer events can overwrite older events in map 340. In an aspect, map 340 can have as a large footprint as an OES it is mapping, and therefore a dedicated buffer can be employed to store map 340 in tier-1 type storage. SCC 320 can transfer portions of map 340 to other types of storage, e.g., tier-2 storage, where the buffer can become full, e.g., an iteration of map 340 can be 'dumped' to backend storage where a map buffer is sufficiently filled. In an aspect, the key-value format of map 340 can be substituted with a series of events, e.g., a native OES stream format, when map 340 is dumped to tier-2 storage. As such, references to events in map 340 can be replaced with the events themselves when map 340 is dumped. In an aspect, an efficiency of stream compaction can depends on a map buffer size, wherein the larger the buffer, the lower a probability of duplicate routing keys in a compacted OES resulting from concatenating sequential dumps of iterations of map 340. This aspect can be appreciated by understanding that a sufficiently large map buffer to hold an entire map of an OES can reference each key to at least a latest progress event, whereby the map can allow system recovery to the last state of every key rather than to every event of every key. Accordingly, in this example, there would be no duplicate events for a same key. However, where in this example, the buffer can be smaller and the map can be dumped, for example, once in addition to a second map iteration in the buffer, then the dumped portion of the map can comprise a key-event and the buffered map can also possibly comprise another event for the same key, resulting in a recovery based on the dumped map iteration and the buffered map iteration comprising two events to the same key. This is not problematic from a recovery standpoint, but it can be viewed as decreasing the efficiency of the recovery by having two events for a same key value. This can be more apparent where if the buffer, for example is so small so as to need several thousand iterations dumps, then there theoretically can correspondingly be several thousand events to a same key, which can slow the recovery to a last known state of the OES. Further, retention of additional data can be needed where compaction typically occurs in parallel with read operations and an OES system can preserve enough information to translate storage locations of events within the original stream into storage locations of events within the compacted stream.

System 300 can facilitate reducing an amount of data read from different tiers, e.g., tier-2, to generate and update map 340 in support of OES compaction. As is illustrated, chunks(s) 330 can comprise chunks having a header that can include a de-duplicated list of routing keys used by events correspondingly stored in a body of the chunk, e.g., similar to, or the same as, is illustrated herein for chunk 230. A key of the de-duplicated list of keys can correspond to a referential location(s) of an event(s) stored via the body of a chunk of chunk(s) 330, e.g., a key can be correlated to a most recent event of having key such that where there can be multiple events of the same key, the de-duplicated list can, in some embodiments, only reference a most recent, e.g., latest progress point, event in the chunk. In other embodiments, the list of keys can reference some or all events of that key. Accordingly, in illustration 311, Map 340 can comprise events stored in type-1 storage and can further comprise references to events stored in type-2 storage, e.g., the dashed arrows reference a chunk that stores an event of the key as is determined from reading the header of the chunks stored in tier-2 storage. This can avoid needing to read the bodies of the tier-2 chunks in order to populate map 340. This can substantially reduce an amount of data that needs to be communicated to populate map 340. Additionally, the chunk format comprising a header can be easily accommodated in older OES systems that stored data in chunks not comprising a header because a read operation directed to reference to an event via map 340 can read the event back rather than reading the reference back, e.g., events from the chunk in the new format can be easily transformed back to the native stream format in RAM before sending them to the client (stream reader). Moreover, highly repetitious events to a same routing key can enable substantial compression ratio for stream data, especially where the event has a larger storage footprint firstly because a reference to an event via an index into a chunk in tier-2 storage can be of a smaller storage footprint than accessing the event itself, and secondly, the map can comprise a single event, e.g., a latest/recent event, some events, or all events, meaning that the can, in some embodiment, may not even include reference to every event reference in tier-2 storage. As an example, if a tier-2 chunk stores four 100 megabyte (MB) events and indexes via a header, event positions in a body of the tier-2 chunk via a one byte index value correlated to a key value in the header, and where every example event has the same key, e.g., each event is a newer event of a same action such as repeatedly storing events indicating widgets that passed QC testing in a production facility, then in this example, a map, e.g., map 340, containing a key-value pair in tier-1 storage, where the key is 'passed QC' and the value is the indexed reference to the latest event in the tier-2 chunk, can comprise the key, a one byte index value, and an identification of the chunk in tier-2 storage, which can be substantially smaller than actually reading the 100 MB event from tier-2 storage into tier-1 storage. Where the example map is dumped to tier-2 storage, the indexed reference can be replaced with the event itself. Moreover, where the map is read to enable recovery of a latest OES state, for example after rebooting a reader application, attempting to read the reference from the map can instead cause the event to be read and returned, e.g., the event can be returned as a substitute for the indexed reference.

Figure 4:
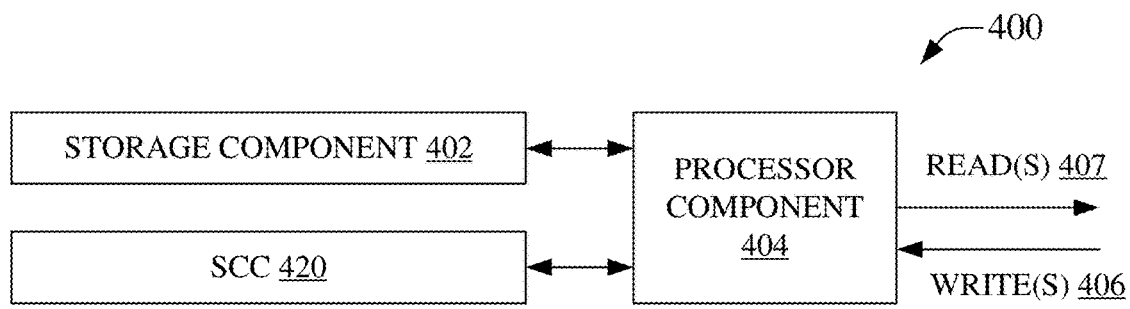
FIG. 4 is an illustration of an example system facilitating compaction of an ordered event stream via employing a chunk comprising a header facilitating storage of referential event routing key relationship information, in accordance with aspects of the subject disclosure.

FIG. 4 is an illustration of an example system 400, which can enable compaction of an ordered event stream via employing a chunk comprising a header facilitating storage of referential event routing key relationship information, in accordance with aspects of the subject disclosure. System 400 can comprise Ordered event stream data storage system 400 can comprise processor component 404 that can receive write(s) 406 and enable read(s) 407 for events stored via storage component 402. SCC 420 can enable mapping of events stored via storage component 402. In an embodiment, storage component 402 can comprise storage different types of event storage, e.g., a tier-1 store, a tier-2 store, etc. Events can be stored in tier-1 type storage and via chunk(s) 430, e.g., in tier-2 type storage. In an embodiment, tier-2 storage can be via an ECS-type environment that can store chunks such as chunk 430.

Chunk 430 can comprise header 432 and body 436. Header 432 can comprise routing key(s) 433. Body 436 can comprise event(s) 437. In an aspect, a routing key of routing key(s) 433 can correspond to a routing key of an event of event(s) 437. As an example, routing key(s) 433 can comprise keys "KA", "KB", and "KD" that can correspond to events A1, B1, and D1 of event(s) 437. In this example, header 432 can therefore comprise information, e.g., routing key(s) 4331, 4332, 4333, etc., that can indicate that the body comprises events, e.g., A1, A2, A3, B1, D1, etc., via a key value, e.g., key 4331A, 4332A, 4333A referencing an index position in the body of a chunk, e.g., as index 4331B, 4332B, 4333B, etc.

In an aspect, routing key(s) 4331 can indicate key-index pairs wherein there can be multiple key-index pairs for a same key resulting from more than one event of the chunk corresponding to a given key. In another aspect, routing key(s) 4332 can indicate de-duplicated keys and their corresponding indexes to one, some, or all, same-keyed events in the chunk. In a further aspect, routing key(s) 4333 can indicate a de-duplicated key and a corresponding index of a latest progress point event of the chunk. Accordingly, routing key(s) 4331, 4332, and 4333, for example, can represent the same events stored in chunk 430. In this example, event A1 having key KA can be at index X1 into body 436, event A2 having key KA can be at index X15 into body 436, event A3 having key KA can be at index X34 into body 436, event B1 having key KB can be at index X32 into body 436, and event D1 having key KD can be at index X9 into body 436. As such, in a first permutation with header 432 comprising routing key(s) 4331, it can be observed that there can be three duplicate entries for key 4331A of 'KA', each having a different index into the body for the corresponding stored event, e.g., A1 at X1, A2 at X15, and A3 at X34 into body 436. Moreover, in a second permutation with header 432 comprising routing key(s) 4332, it can be observed that there can be one de-duplicated entry for key 'KA' in key 4332A, but that the corresponding index 4332B can comprise one, some, or all of the corresponding indexes, here illustrating all three indexes, e.g., again illustrating A1 at X1, A2 at X15, and A3 at X34 into body 436. Furthermore, in a third permutation with header 432 comprising routing key(s) 4333, it can be observed that there can be one de-duplicated entry for key 'KA' in key 4332A, and the corresponding index 4333B can comprise a most recent, e.g., latest progress point, corresponding index, here illustrating A3 at X34 into body 436, and not indicating the position of either A1 or A2. In an aspect, the events written in event(s) 437 of body 436 can, in some embodiments, also comprise the key written as part of the event, e.g., both the body and the header can include a recitation of the key. In other embodiments, the events written in event(s) 437 of body 436 can comprise data that can be used to determine the key, e.g., the header can comprise a key and the body can comprise an event whose data can be employed to return the same key. Further, the events written in event(s) 437 of body 436 can, in some embodiments, not comprise a copy of the key nor comprise data facilitating determining the key, e.g., the key is stored in the header only. In headers employing routing key(s) 4333, it can be expected that use of the map will result in treating older same-key events as compactable, e.g., where the map is used to recover a system state, the recovered state will include event A3 referenced at X34 of body 436 of chunk 430 but can be ignorant of events A1 and A2 of the same chunk because they are not references in routing key(s) 4333.

Similar to the above example, it is noted that where routing key(s) 4332 are employed, mapped recovery, as above, can include one or more of A1, A2, and A3 because all are referenced. However, in some instances of this example, recovery can indicate that only a most recent event of key KA is to be used in the recovery, which can result in recovering only A3 at X34 of body 436 of chunk 430 based on the parameter indicating that older events of the key KA are to be ignored. In some further embodiments, A1 and A2 can be recovered based on a parameter indicating that the last two KA keyed events are to be recovered. Similarly, a parameter can indicate that more or all events are to be recovered, which can enable recovering A1 to A3, etc. Moreover, while possible, if not practical, recovery of any combination of A1, A2, and A3, can be indicated via a recovery parameter, for example, A1 and A1, or, also for example, just A2, etc., though it is unclear at this time where this would be particularly useful even though it is explicitly enabled in the instant disclosure.

Figure 5:
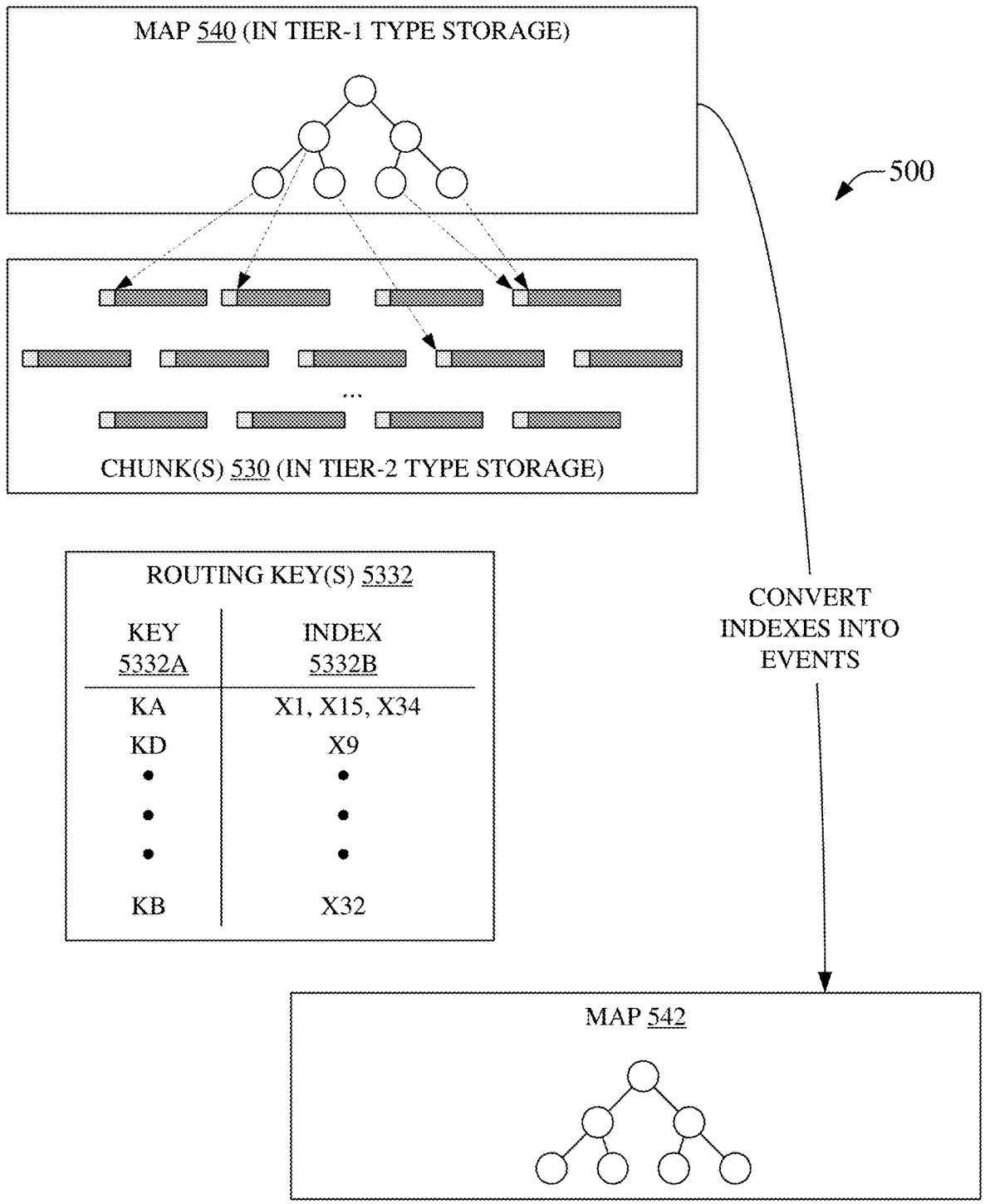
FIG. 5 is an illustration of an example system that can enable compaction of a multi-tier ordered event stream based on an event, in accordance with aspects of the subject disclosure.

FIG. 5 is an illustration of a system 500 that can facilitate compaction of a multi-tier ordered event stream based on an event, in accordance with aspects of the subject disclosure. System 500 can comprise map 540, which can be stored in tier-1 type storage. Map 540 can comprise nodes that can include references into chunks stored via tier-2 type storage, for example chunk(s) 530 in tier-2 type storage, e.g., a node can comprise a key and a value indicative of an index into a body of an identified chunk stored in tier-2 type storage. As such, the sum of the storage space consumed by map 540, which can in some nodes employ reference to an event, can be less than when substituting the events for the references. This can be especially true where the events are large in comparison to the references. Moreover, this improvement can be compounded where the map is directed to recovery of a less than all events of an OES, for example recovering to a last state of the OES, and therefore the map nodes are based on de-duplicated keys and accordingly they reference less than all events having a same key.

In an example, map 540 can be based in part on routing key(s) 5332 of a chunk of chunk(s) 530. In this example, key 5332A can be de-duplicated, e.g., each key KA, KB, KD, or other keys, can be listed only once under key 5332A. Each de-duplicated key can be correlated to an index into the body of the corresponding chunk, e.g., listed under index 5332B. As is illustrated, event D1 with key KD correlates to the $X9^{th}$ index of the example chunk and, similarly, event B1 with key KB correlates to the $X32^{nd}$ index of the same chunk body. Moreover, as is illustrated in this example, events A1, A2, and A3, each with key KA, correspondingly correlates to the $X1'$, $X15^{th}$, and $X34^{th}$ index of the chunk body. In this example, use of map 540 to recover a OES system state can result in the recovered OES having being mapped according to map 542, for example wherein map 542 can substitute the most recent event for each key, e.g., A3, D1, and B1, but ignoring A2 and A1 as older events. The recovery of the OES system can then read events D1, B1, and A3 from the chunk is tier-2 storage based on the reference to the indexed position in the chunk comprised in the referential nodes comprised in map 540, e.g., reading a node having a dashed arrow to a tier-2 stored chunk can return the data of the event stored at the indicated index into the body of the tier-2 chunk. In this example, it is noted that when generating map 540 the use of a reference to an event avoids needing to have a stream compaction component read the entire chunk in tier-2 storage to first find the event, then copy the entire found event from tier-2 to tier-1 storage to place it into map 540. Rather, events of a chunk can be indexed via a header in the instant disclosure. This can enable a stream compaction component reading the headers to find an event. In some embodiments, all, some, or one instance of an event associated with a key, e.g., only a most recent event of a key, etc. Reading the headers can be much faster than reading the entire chunk due to reading less data. Moreover, the header can indicate a reference position, e.g., an index into the chunk body, for an event(s) having a key. This index can be used in map 540 rather than using reading the entire event back into map 540. As such, this can communicate less data between the tier-1 and tier-2 networks, which can be faster and more efficient in terms of consuming computing resources. Further, the headers do not need to be re-read at conversion because the reference is already included in map 540, enabling directly reading the event from the indexed position in the body of the identified chunk in tier-2 storage. The abstraction of the referenced events, e.g., referencing a specific chunk and index into the body of that chunk, etc., can be converted into a non-abstracted event when map 540 is used, e.g., in a recover operation, or other operation, or when map 540 is incrementally dumped to storage, e.g., to backend storage, tier-2 storage, etc., for example when a map buffer becomes full, or other condition indicating that map 540 is to be dumped. However, where map 540 is neither dumped not employed in an operation, it can retain abstracted nodes, e.g., nodes that reference a key and an indexed body location for an identified chunk stored in the illustrated tier-2 storage. Moreover, map 540 can be updated, including updating the abstracted nodes, e.g., where map 540 is directed to storing a last state of keys of an OES, referential values for new events for a given key can replace previously populated referential values of older events of the given key in map 540. As such, when updated map 540 is dumped or used in an operation, the references, now to newer events, can be substituted with the corresponding newer events.

Figure 6:
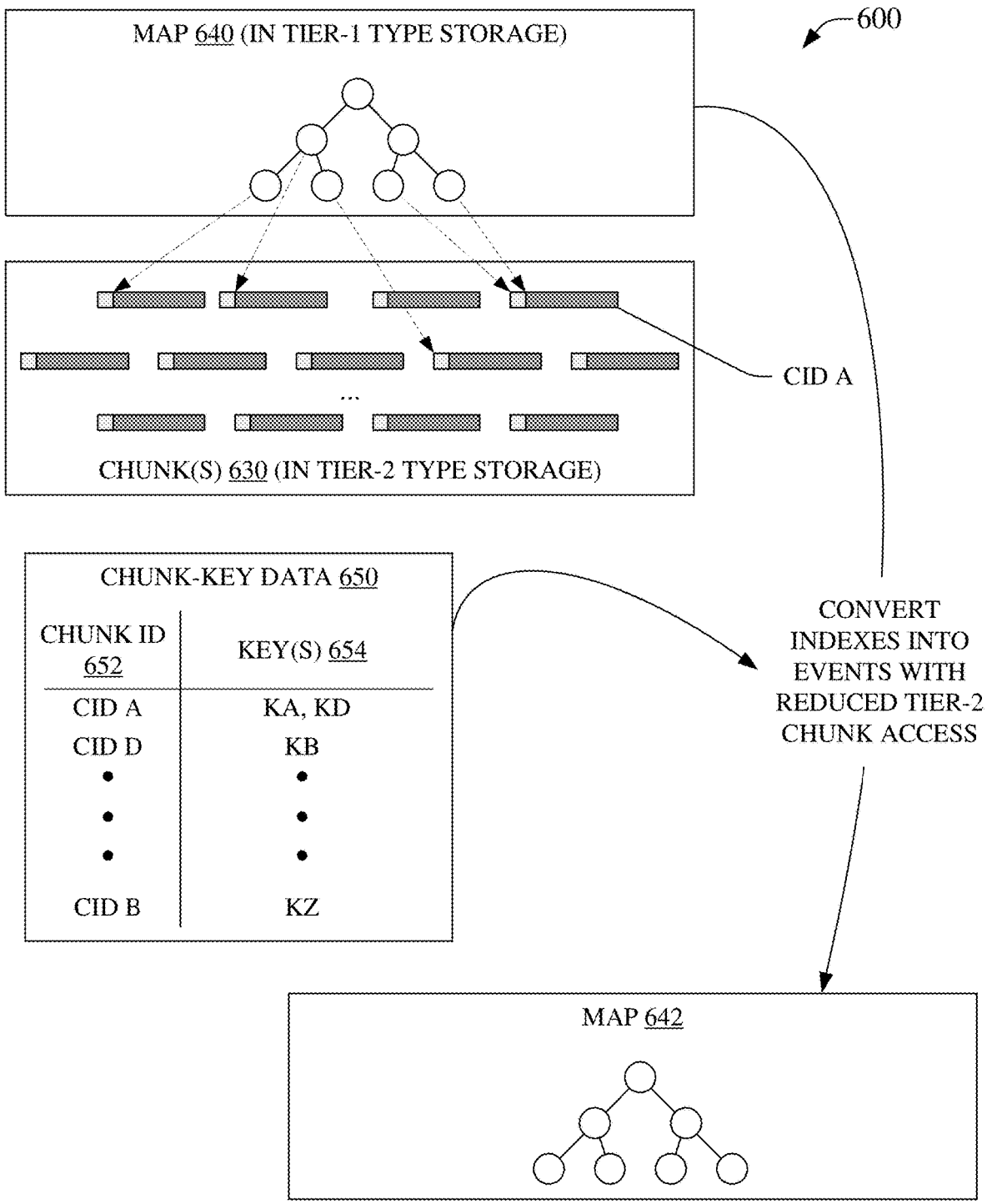
FIG. 6 is an illustration of an example system that can enable compaction of a multi-tier ordered event stream based on an event, wherein the compaction can aggregate chunk body access events based on chunk-key data, in accordance with aspects of the subject disclosure.

FIG. 6 is an illustration of a system 600 that can facilitate compaction of a multi-tier ordered event stream based on an event, wherein the compaction can aggregate chunk body access events based on chunk-key data, in accordance with aspects of the subject disclosure. System 600 can comprise map 640, which can be stored in tier-1 type storage. Map 640 can comprise nodes that can include references into chunks stored via tier-2 type storage, for example chunk(s) 630 in tier-2 type storage, e.g., a node can comprise a key and a value indicative of an index into a body of an identified chunk stored in tier-2 type storage. System 600 can be similar to system 500 in that the sum of the storage space consumed by map 640 can be less than when substituting events in for the references of map 640, more especially where the events are large in comparison to the references and/or where the map is directed to recovery of a less than all events of an OES.

In an example, map 640 can be based in part on routing key(s) of a chunk of chunk(s) 630. In this example, keys can be de-duplicated and can each be correlated to an index into the body of the corresponding chunk, for example, according to 4331, 4332, 4333, 5332, or other routing key(s) stored in a header of a chunk, such as chunk 230, 430, etc. As such, map 640 can be employed in an operation or dumped to storage with substitutes of the references by the events with the benefits disclosed elsewhere herein, wherein reading headers can be much faster than reading the entire chunk due to reading less data, the header can indicate a reference position that can be used in map 640 rather than using reading the entire event back into map 640 facilitating reduced communication between the tier-1 and tier-2 networks that can be faster and more efficient in terms of consuming computing resources. In addition, the abstraction of the referenced events can be converted into a non-abstracted event when map 640 is used, e.g., in an operation or dumping to storage. Map 640 is also updateable in a manner that is the same or similar to that disclosed for map 540.

It can be observed that more than one node of map 640 can refer to the same chunk of chunk(s) 630. As an example, Chunk A of chunk(s) 630, as indicated by CID A, can be referenced by more than one node of map 640, as is indicated by dashed arrows from more than one node pointing to CID A. Accordingly, when map 640 is employed in an operation or dumped, a first node referencing CID A can substitute an event referenced in CID A by reading the event starting from the indexed position in the body of CID A. Further, in this example, when another node referencing CID A occurs in map 640, another referenced event in CID A can be read starting from another indexed position in the body of CID A. This can lead to multiple reads of different portions of chunk A. System 600, for example via a stream compaction component, can generate determine which chunks are referenced in map 640 and can generate chunk-key data, e.g., chunk-key data 650. Chunk-key data 650 can comprise data indicating a chunk identification, e.g., chunk ID 652, and key(s) populating the corresponding chunk, e.g., key(s) 654. As an example, chunk D, indicated as CID D in chunk ID 652, can comprise an event having the key KB. Similarly, CID B can store an event having key KZ. Additionally, CID A is illustrated as comprising events corresponding to both key KA and key KD. In this example, chunk A, e.g., CID A, can comprise at least a first event of key KA and a second event of key KD, which can correspondingly be illustrated by the two dashed arrows from the nodes of map 640 to chunk CID A. Chunk-key data 650 can be employed in converting indexes into events with reduced tier-2 chunk access because when CID A is read for the first event, for example the event having key KA, it can be determined from chunk-key data 540 that a second event, e.g., the event having the key KD, is also to be read from CID A. Accordingly, the both events can be read in a single pass, rather than using multiple passes into CID A as can be experienced in converting map 540 to map 542. As such, converting map 640 to map 642 can occur with reduced chunk access events because reading one or more event from a chunk can be performed in accord with chunk-key data 650.

Figure 7:
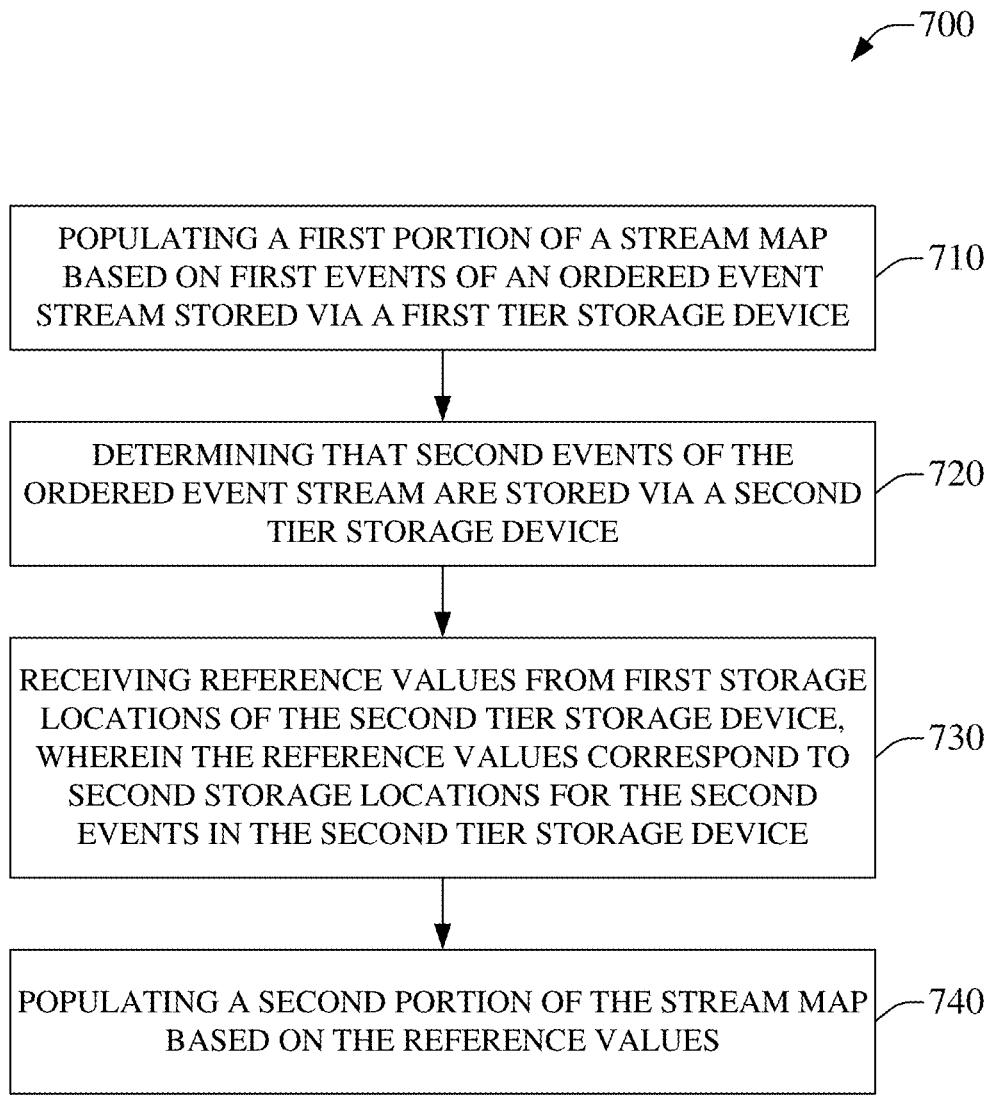
FIG. 7 is an illustration of an example method facilitating compaction of an ordered event stream via storing of a compaction map comprising an event reference, in accordance with aspects of the subject disclosure.
Figure 8:
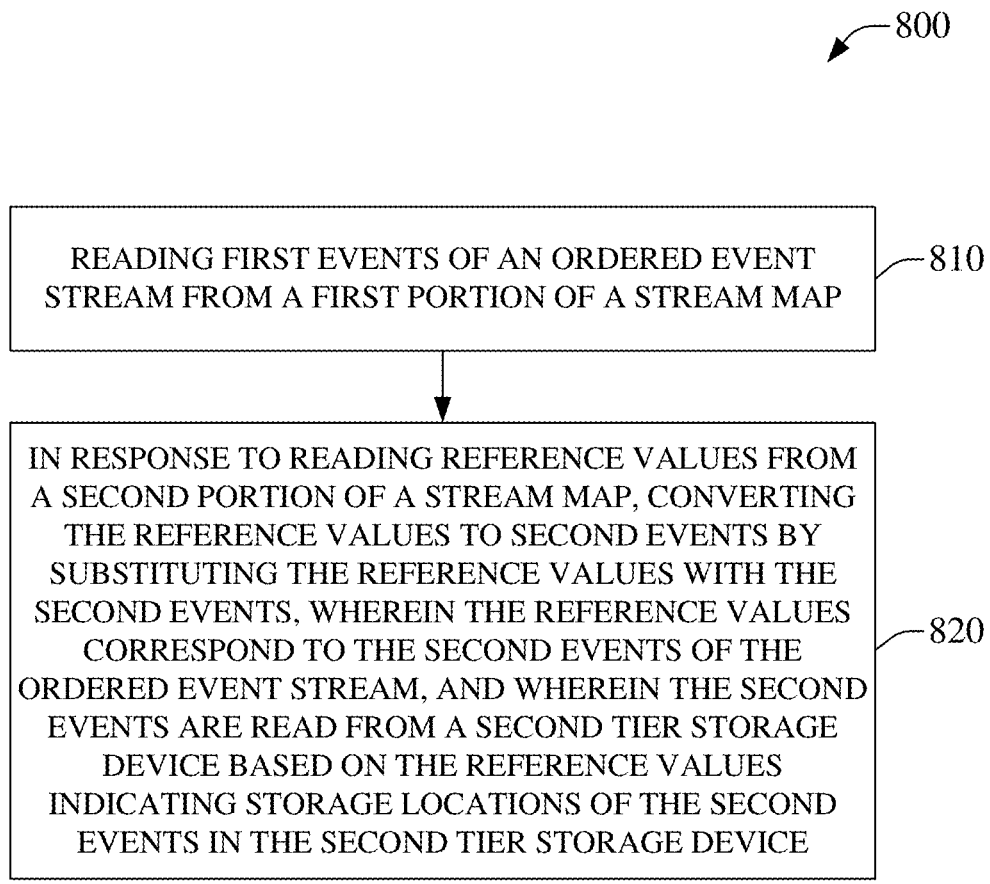
FIG. 8 is an illustration of an example method enabling compaction of an ordered event stream based on a compaction map, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate compaction of an ordered event stream via storing of a compaction map comprising an event reference, in accordance with aspects of the subject disclosure. At 710, method 700 can comprise populating a first portion of a stream map based on first events of an OES stored via a first tier storage device. As is noted elsewhere herein, first tier storage can be, in some embodiments, storage that enables faster access to events stored therein in contrast to a second tier of storage. In an aspect, this faster access can desirable for storage of some events, for example hotter events, but can be an inefficient use of resources, particularly where the first tier storage can be associated with disadvantages in comparison to the second tier storage. As an example, first tier storage can be expensive, power hungry, and have a shorter life span than second tier storage, however the first tier storage can provide faster event access than the second tier storage. In this example, it can be beneficial to store some data that needs fast access via first tier storage and some data than doesn't need the fast access on the tier two storage. Generally use of multiple tiers of storage seeks to take advantage of characteristics of each type of storage employed. As such, a portion of a map can store some events in a first tier of storage in method 700 at 710.

At 720, method 700 can comprise determining that second events of the ordered event stream are stored via a second tier storage device. As is noted, for some OESs, it can be inefficient to store all data in a single tier of storage. As such, an OES can store data in both a first tier and a second tier of storage types. As an example, a first tier can be a single data center so that event access can be performed via fast local networks and across short distances to facilitate fast event access. In this example, a second tier of storage can be via a geographically diverse set of storage nodes that can communicate over a wide area network, for example, employing ECS by DELL EMC. Event access in this example second tier can be slower but can also enable storing of more data because an ECS-type tier can simply add additional storage locations on the fly. Other example advantages of this second tier are readily appreciated, for example, lower cost long term storage, distribution of failure risks/data loss events, higher levels of redundancy, and other advantages.

Method 700, at 730, can comprise receiving reverence values from first locations of the second tier storage device. In an aspect, event storage in an example second tier storage device can be via a chunk such as chunk 230, etc. In this example chunk, events can be written in to a body, e.g., body 236 as event(s) 237. Moreover in this example, reference values can be written to a header, e.g., 232 as routing key(s) 233, etc. Accordingly, the reference values from eh first locations of the second tier storage device can be read from, for example, header 232, whereby the reference values can comprise a key and an index into the body of the chunk. Accordingly, given the chunk identifier and the index, it can be determined where in the second tier storage device an event of the key is written. Accordingly, at 730, method 700 indicates that the reference values correspond to second storage locations for the second events in the second tier storage device.

At 740, method 700 can comprise populating a second portion of the stream map based on the reference values received at 730. At this point method 700 can end. Method 700 enables adding the references to events stored via the second tier storage device to the stream map. As such, the stream map can comprise nodes that, as at 710, can comprise events and, as at 740, can comprise references to events. As is noted elsewhere herein, typically a reference to an event can have a smaller data footprint than the event being referenced and, accordingly, communicating a reference from the second tier to the first tier for storage in the map can constitute communicating less data over a network in addition to storing less data in the map, e.g., communicating and storing the reference, which is can often be smaller than the event being referenced, can improve efficient use of computing resources. Moreover, where the stream map can be used for recovery of less than the entire OES, e.g., recovering to a last state of an OES, recovering to a determined progress point, or compacting an OES to a designated progress point, or other similar actions, can be facilitated by updating the stream map to reflect references to events that meet the compaction parameters, e.g., reference to events that are stale, older than a determined time, lower than a selected progress point, etc., can all be ignored in the mapping. Accordingly, updating the map by refreshing nodes, which can comprise re-reading references to events, can also be more computing resource friendly than comparably re-reading entire events. Moreover, determining what references to events are to be stored in the stream map can comprise reading the contents of chunk headers, e.g., the first storage locations at 730, in contrast to reading entire chunks of events to find keys, which aspect can also be desirable as being computing resource efficient. Akin to this aspect, once the stream map is populated, restoring the OES from the map can directly substitute the events for the references to events via the body of a chunk without needing to re-read the header, e.g., the reference can point directly to the event storage location in the body of the second tier chunk. As such, method 700 can offer advantages to use of multi-tier storage systems for OES events mapping supporting stream compaction operations.

FIG. 8 is an illustration of an example method 800, which can enable compaction of an ordered event stream based on a compaction map, in accordance with aspects of the subject disclosure. At 810, method 800 can comprise reading first events of an OES from a first portion of a stream map. As is disclosed, for example in method 700, a first portion of a stream map can directly comprise events, for example read from a first tier storage device. The stream map can further comprise references to events stored in a second tier storage device. The references can be determined, for example, from reading headers of chunks stored in the second tier of storage, as contrasted with reading entire chunks to find the events themselves. In an aspect, the relationship between an event key and an event instance location can be preserved in the header at the time of generating the above example chunk, e.g., when the chunk is generated, the events stored in the body can be used to populate the header of the chunk with a key and a location of the event of the key, where the location is typically an index value into the body of the chunk. As such, the example chunk enables looking up key values in a chunk header and determining a location of corresponding events in the body of the chunk. Accordingly, when using a stream map that comprises references to events stored in a second tier storage device, the reverence can be directly substituted with the event itself by reading from the location indicated by the reference.

At 820, method 800 can comprise, converting the reference values to second events by substituting the reference values with the second events. At this point method 800 can end. The converting can be in response to reading the reference values from a second portion of the stream map. Moreover, the reference values can correspond to the second events of the ordered event stream because that relationship is preserved when the chunk is generated, e.g., the events stored in the body of the chunk can be used to populate the references to event in a header of the chunk. Further, the second events can be read from the second tier storage device based on the references values indicating storage locations of the second events in the second tier storage device. This can be seen, for example, in routing key(s) 5332 correlating each of key 5332A with one or more value in index 5332B, e.g., one or more event corresponding to a given key is stored in an location of the chunk indicated by the index value. Accordingly, given the index value, the event can be read directly from the body of the corresponding chunk without needing to re-read the header of the chunk Generating chunks that enable indexing of events stored in the chunk can enable populating an OES map with a reference to a stored event that can be computing resource efficient from a search standpoint, e.g., searching the header can be faster than searching the chunk for an event, from a communication standpoint, e.g., communicating a reference can be less resource intensive than communicating an event itself, from a storage standpoint, e.g., storing a reference to an event can be more computing resource efficient than storing the event itself, from an updating perspective, e.g., updating a reverence in an OES map can be more efficient than updating an entire event in the OES map, and in other aspects as are disclosed elsewhere herein. Generally, allowing a second tier storage device to store a chunk and then populate a header based on the events stored in the body of the chunk can avoid burdening a first tier storage device with these tasks. Moreover, rather than having a first tier initiate a search through whole chunks of a second tier to find events of a key or range of keys, the search can be constrained to the headers of the chunks allowing for faster more efficient searches. Furthermore, the references, rather than entire events, can communicated and stored in the first tier OES map and can be updated efficiently. Accordingly, method 800 can be direct and simple, enabling reading of first tier events from the map and then direct substitution, based on the stored references to events in the map, of second tier events from the body of chunks of the second tier. Selection parameters for events/references included in the map can enable efficient compaction of an OES according to populating the map with relevant events and reverences to events, for example at method 700 in accordance with the subject matter disclosed in the instant application.

Figure 9:
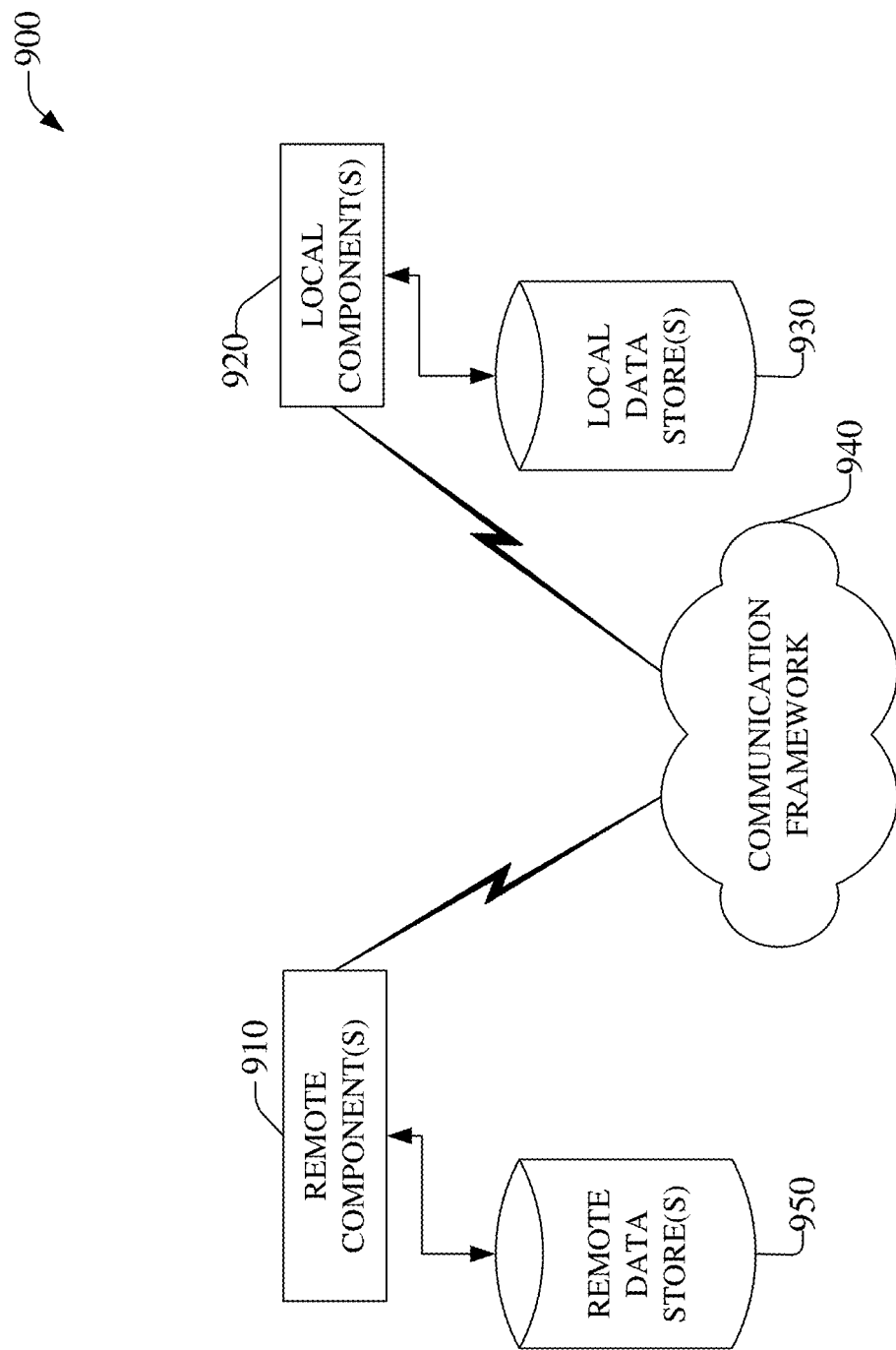
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, 202, 302, 402, etc., a remotely located processor device comprised in processor component 104, 204, 304, 404, etc., a remotely located device comprised in stream compaction component 120, 220, 320, 420, etc., a remotely located device connected to a local component via communication framework 940, or other remotely located devices. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, 202, 302, 402, etc., a local processor device comprised in processor component 104, 204, 304, 404, etc., a local device comprised in stream compaction component 120, 220, 320, 420, etc., or other local devices.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, mapping, restoring from a mapping, writing, reading, erasing, expiring, etc., of events of segments of an OES(s) in systems 100, 200, 300, 400, 500, 600, etc., can be communicated via communication framework 940 among storage components of an OES storage network 100, 200, 300, 400, 500, 600, etc., e.g., to facilitate adapting, altering, modifying, erasing, deleting, freeing, etc., events stored via one or more OES(s), as disclosed herein.

Figure 10:
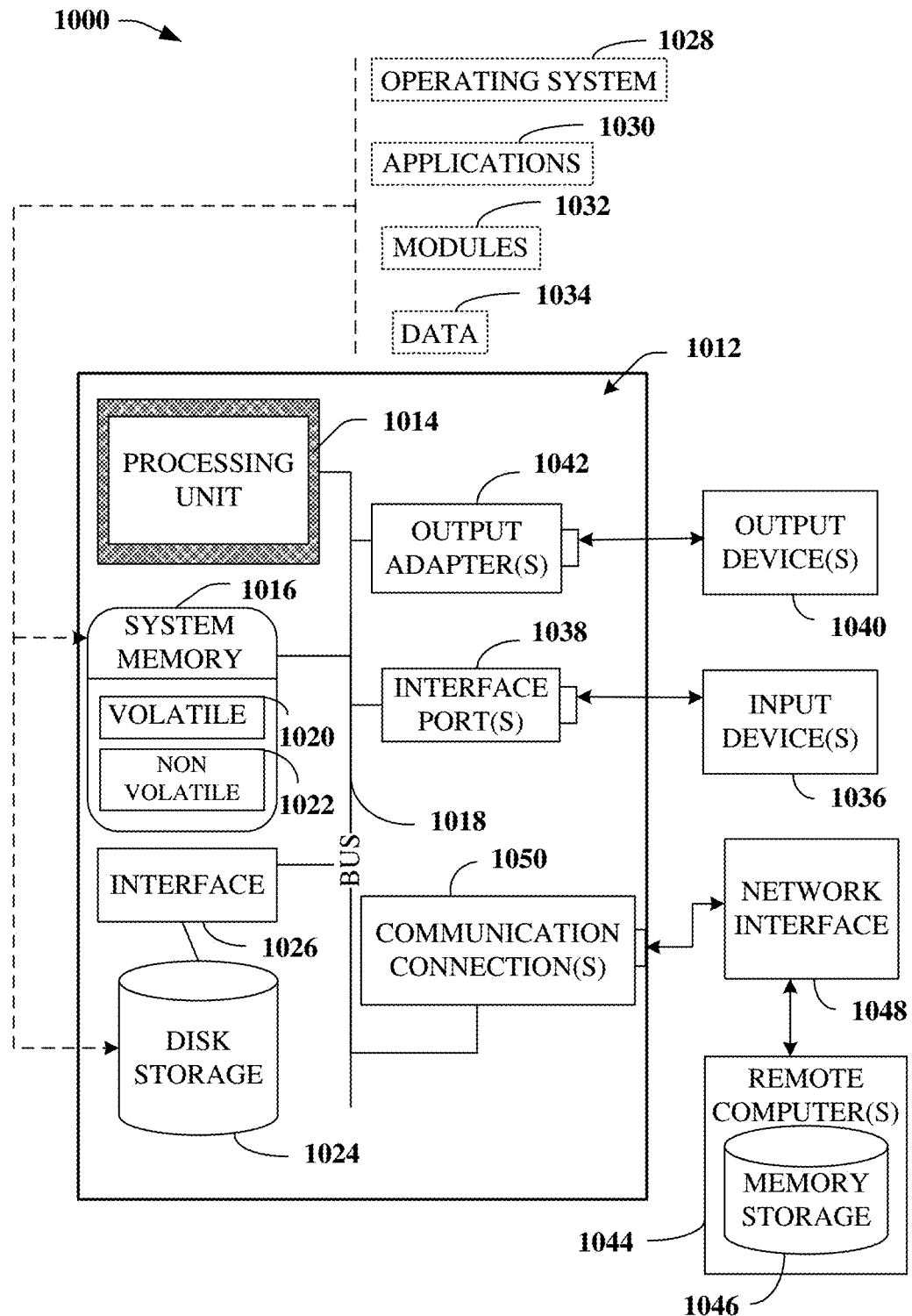
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, processor component 104, stream merging component 120, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising adding a first event to stream map, adding a reference to a second event to the stream map, and generating a compacted ordered event stream based on a stream map of relevant events of an ordered event stream, wherein the stream map comprises fewer nodes than a number of events of the ordered event stream.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
generating a first portion of a stream map comprising a first event of an ordered event stream, wherein the first event is stored via a first storage device of first storage devices; and
generating a second portion of the stream map comprising a reference to a second event of the ordered event stream, wherein the second event is stored via a second storage device of second storage devices.

2. The system of claim 1, wherein the first storage devices are of a first tier of storage devices, wherein the second storage devices are of a second tier of storage devices, and wherein the first tier and the second tier are different tiers of storage devices.

3. The system of claim 2, wherein the first tier of storage devices is associated with storing first tier events that are more frequently accessed than second tier events associated with storage via the second tier of storage devices.

4. The system of claim 1, wherein the reference to the second event is received from a first portion of a chunk stored via the second storage device.

5. The system of claim 4, wherein the reference to the second event is determined from a location in a second portion of the chunk stored via the second storage device, wherein the second event is stored at the location, and wherein the first portion is a different portion of the chunk than the second portion of the chunk.

6. The system of claim 4, wherein the reference to the second event corresponds to a routing key also stored in the first portion of the chunk.

7. The system of claim 6, wherein the routing key is a de-duplicated routing key.

8. The system of claim 7, wherein the reference is a first reference, and wherein routing key further corresponds to a second reference to a third event.

9. The system of claim 8, wherein the third event is stored at a location in a second portion of the chunk stored via the second storage device, wherein the second reference to the third event is determined from the location, and wherein the first portion is a different portion of the chunk than the second portion of the chunk.

10. The system of claim 1, wherein a sum of events and references of the stream map is less than the number of events of the ordered event stream, wherein the events comprise the first event, and wherein the references comprise the reference to the second event.

11. The system of claim 10, further comprising generating a compacted ordered event stream based on the stream map having less than the number of events of the ordered event stream.

12. The system of claim 11, wherein the generating the compacted ordered event stream comprises reading the second event from the second storage device based on the reference to the second event comprised in the stream map.

13. A method, comprising:
- determining, by a system comprising a processor, a first event stored via a first storage device of a first tier of storage devices;
- determining, by the system, a second event comprised in a chunk stored via a second storage device of a second tier of storage devices, wherein the first tier is a different tier than the second tier, and wherein the first event and the second event are events of an ordered event stream; and
- populating, by the system, a stream map of relevant portions of the ordered event stream, wherein the populating comprises writing the first event to the stream map, and wherein the populating further comprises writing a first reference to the second event to the stream map.

14. The method of claim 13, wherein the writing the first reference to the second event to the stream map comprises reading, from a header portion of the chunk, the first reference, wherein the first reference is based on a location at which the second event is stored via a body portion of the chunk, wherein a key that corresponds to the first reference is also stored via the header portion, and wherein the header portion is a different portion of the chunk than the body portion of the chunk.

15. The method of claim 14, wherein the key further corresponds to a second reference to a third event, and wherein the third event is stored at another location via the body portion of the chunk.

16. The method of claim 13, wherein the operation further comprise compacting the ordered event stream based on the count of relevant portions of the ordered event stream comprised in the stream map being less than the count of events of the ordered event stream.

17. A non-transitory machine-readable medium, comprising executable instructions that, when executed by a processor, facilitate performance of operations, comprising:
- adding a first event to stream map, wherein the first event is stored via a first class of storage devices;
- adding a reference to a second event to the stream map, wherein the second event is comprised in a body portion of a chunk stored via a second class of storage devices, and wherein the reference to the second event corresponds to a key value, and wherein the key value and the reference are comprised in header portion of the chunk; and
- generating a compacted ordered event stream based on a stream map of relevant events of an ordered event stream, wherein the stream map comprises fewer nodes than a number of events of the ordered event stream.

18. The non-transitory machine-readable medium of claim 17, wherein a second reference to a third event corresponds to the key value and wherein the second reference is also comprised in the header portion of the chunk.

19. The non-transitory machine-readable medium of claim 17, wherein the adding the reference to the stream map comprises reading the header portion of the chunk.

20. The non-transitory machine-readable medium of claim 17, wherein the generating the compacted ordered event stream comprises substituting the second event for the reference by reading the second event from the body of the chunk based on the reference from the stream map.

* * * * *